Dec. 23, 1958 W. V. SUCHTER 2,865,070
CLAMP FOR SECURING A HOSE TO A NOZZLE OR COUPLING
Filed Oct. 30, 1957
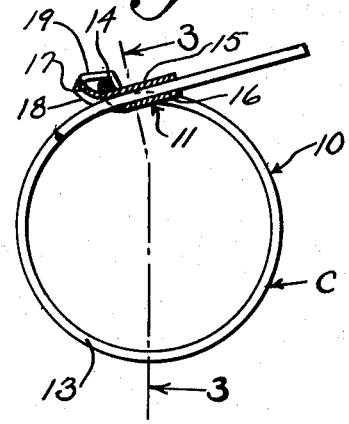
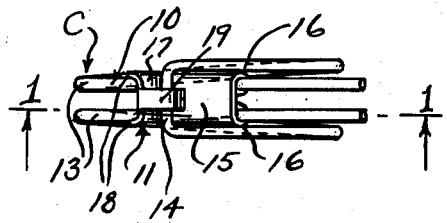
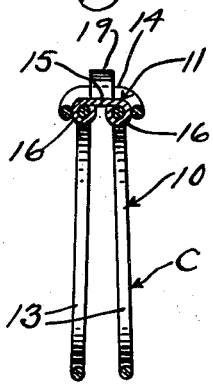
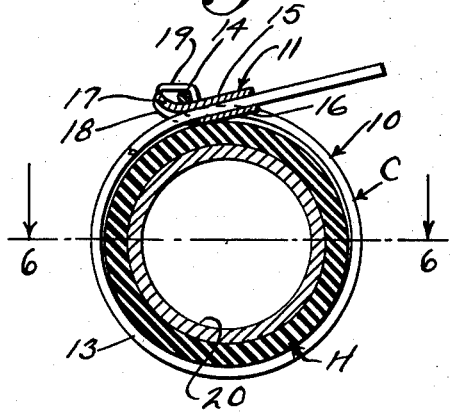
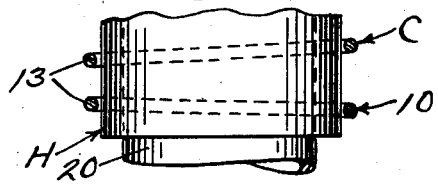
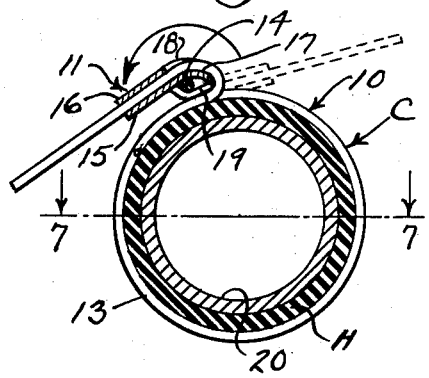
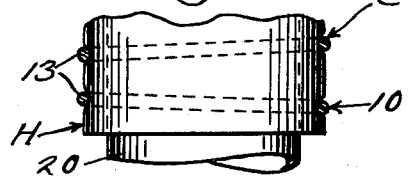
INVENTOR
WILMA V. SUCHTER
BY
ATTORNEYS

United States Patent Office 2,865,070
Patented Dec. 23, 1958

2,865,070

CLAMP FOR SECURING A HOSE TO A NOZZLE OR COUPLING

Wilma V. Suchter, Milwaukee, Wis., assignor to Harry Nick, Milwaukee, Wis.

Application October 30, 1957, Serial No. 693,374

4 Claims. (Cl. 24—28)

This invention appertains to couplings and more particularly to a novel clamp for effectively securing a hose in fluid tight connection with a coupling, nozzle or the like.

One of the primary objects of the invention is to provide a novel clamp which can be quickly and easily applied to the hose and initially adjusted and tightened thereon, and then thereafter operated without the use of tools to firmly grip the hose and contract the hose tight about the coupling in intimate contact therewith.

Another salient object of the invention is the provision of a hose clamp which merely embodies two members, namely, a substantially U-shaped clamping wire having concentric hose gripping legs or rings and a connecting bight portion and a tightening cam saddle and guide for the clamping wire, the saddle being pivotally mounted on the bight portion of the clamping wire and having guide sleeves for slidably receiving the terminals of the legs, so that the legs can be initially fitted and adjusted around the hose, the saddle being swingable over the hose and wire for finally contracting the legs tight about the hose.

A further object of my invention is to provide a hose clamp of the above character, which will be durable and efficient in use, one that will be simple and easy to operate and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing, Figure 1 is a sectional view through the improved clamp, the section being taken on the line 1—1 of Figure 2, looking in the direction of the arrows, the view showing the clamp in its initial position before tightening;

Figure 2 is a top plan view of the clamp;

Figure 3 is a transverse sectional view through the clamp taken on the line 3—3 of Figure 1, looking in the direction of the arrows;

Figure 4 is a view similar to Figure 1 but showing the clamp applied to a hose and coupling;

Figure 5 is a view similar to Figure 4, but showing the clamp in its adjusted contracted position;

Figure 6 is a sectional view through the clamp taken on the line 6—6 of Figure 4, looking in the direction of the arrows and showing the clamp applied to a hose and coupling but prior to the tightening thereof, and Figure 7 is a view similar to Figure 6, but taken on the line 7—7 of Figure 5, looking in the direction of the arrows and showing the clamp in its operative contracted position.

Referring to the drawing in detail wherein similar reference characters designate corresponding parts throughout the several views, the letter C generally indicates the improved hose clamp and the same includes the clamping wire 10 and tightening saddle 11.

The clamping wire 10 is formed from a single length of material and the same is bent into a substantially U-shape to provide a pair of spaced parallel legs 13 and a connecting bight portion 14. The legs 13 are bent to form rings and the terminals of the legs extend substantially tangentially to the rings for a purpose, which will now appear.

The saddle 11 is pivotally associated with the clamping wire 10 and this saddle is formed from a metal stamping and includes a body portion 15. The body portion 15 for a part of its length, has its opposite sides rolled to provide spaced parallel guide sleeves 16. The body 15 at the inner ends of the guide sleeves 16 is rolled outwardly to provide a cam face 17 and the edges of the body on each side of the cam face 17 can be provided with inturned retaining flanges 18. The extreme inner end of the body has formed thereon a bent back centrally disposed tongue 19 which forms an eye or loop for pivotally receiving the bight portion of the clamping wire.

In accordance with the invention, the straight terminals of the legs 13 of the clamping wire are slid through the guide sleeves 16. The clamp is now ready for sale, and ready to be applied to a hose and coupling.

In Figures 4 to 7, inclusive, I have shown the clamp applied to a hose H, which is placed about a coupling or the like 20. As shown in Figure 4, the clamp C is slid over the hose H and the coupling 20, after which the terminals of the legs 13 are moved through the sleeves so that the legs will engage the hose. After this is done, the terminals of the legs are firmly grasped and the legs and the saddle are bent back, as shown in Figure 5, and the saddle will pivot on the bight portion 14 of the clamping wire. The cam face 17 will bend the legs and effectively tighten the legs into firm gripping contact with the hose and the hose will be contracted about the coupling 20. The flanges 18 act as means to confine the legs and to prevent the legs from spreading too far laterally apart.

From the foregoing description, it can be seen that a novel and simple hose clamp has been provided which can be easily applied to a hose and thereafter operated for tightly gripping the hose, without the use of extraneous tools.

Various changes in details may be made without departing from the spirit or the scope of this invention, but what is claimed as new is:

1. A hose clamp formed from a single strand of wire comprising a pair of open concentric rings terminating in substantially straight legs at one end and a bight portion connecting the rings together at the other end, a saddle pivotally mounted on the bight portion and having guide sleeves slidably receiving the legs and an outwardly curved cam face whereby upon the swinging of the saddle on the bight portion the rings will be bent and contracted about a hose.

2. A device for securing a hose in intimate gripping contact with a coupling or the like comprising a hose clamping member formed from a single strand of wire and including a pair of concentric open rings and a bight portion connecting the rings together at one end, said rings terminating at the other end in straight portions, and a saddle pivotally mounted upon the bight portion and having a pair of spaced parallel sleeves slidably receiving the straight portions and an out-turned cam face, the saddle being swingable on the bight portion with the cam face engaging the rings and bending said rings and contracting the rings into intimate gripping contact with the hose.

3. A device as defined in claim 2, and said saddle having inwardly directed guide flanges on its side edges and extending along the edges of the cam face.

4. A device as defined in claim 2, and said saddle also having a bent back tongue forming an eye for pivotally receiving the bight portion.

No references cited.